United States Patent [19]
Ruedisueli

[11] Patent Number: 5,874,694
[45] Date of Patent: Feb. 23, 1999

[54] WEIGHING APPARATUS INCLUDING WIND SCREEN MEANS

[75] Inventor: Armin Ruedisueli, Jona, Switzerland

[73] Assignee: Mettler-Toledo GmbH, Greifensee, Switzerland

[21] Appl. No.: 470,420

[22] Filed: Jun. 6, 1995

[30] Foreign Application Priority Data

Nov. 9, 1994 [CH] Switzerland .............................. 3351/94

[51] Int. Cl.⁶ .................................................. G01G 21/28
[52] U.S. Cl. .......................... 177/180; 177/181; 177/238; 312/138.1; 49/410
[58] Field of Search .................................... 177/180, 181, 177/182, 238, 239, 240, 241, 242, 243; 312/138.1, 139.2, 140, 318; 49/125, 410

[56] References Cited

U.S. PATENT DOCUMENTS

| | | | |
|---|---|---|---|
| 2,120,783 | 6/1938 | Hoffman | 312/138.1 |
| 3,990,183 | 11/1976 | Meggs et al. | 49/125 |
| 4,176,496 | 12/1979 | Rock et al. | 49/410 |
| 4,664,207 | 5/1987 | Knothe et al. | 177/181 |
| 4,716,693 | 1/1988 | Webster | 49/410 |
| 5,170,855 | 12/1992 | Kunz et al. | 177/181 |
| 5,264,667 | 11/1993 | Luechinger et al. | 177/180 |
| 5,285,021 | 2/1994 | Luechinger et al. | 177/181 |
| 5,298,688 | 3/1994 | Luechinger et al. | 177/180 |

Primary Examiner—Randy W. Gibson
Attorney, Agent, or Firm—Laubscher & Laubscher

[57] ABSTRACT

A windscreen for a weighing scale apparatus includes a base, stationary vertical front and rear walls, a horizontal top wall, and a pair of opposed slidable side walls adapted to cooperate with the base, front, rear and side walls to define a weighing chamber containing a weighing pan. Slide means including an upper guide member, a lower guide member and a lower slide member are provided to connect at least one of the side walls with the housing for sliding movement between closed and open positions relative to the housing.

8 Claims, 3 Drawing Sheets

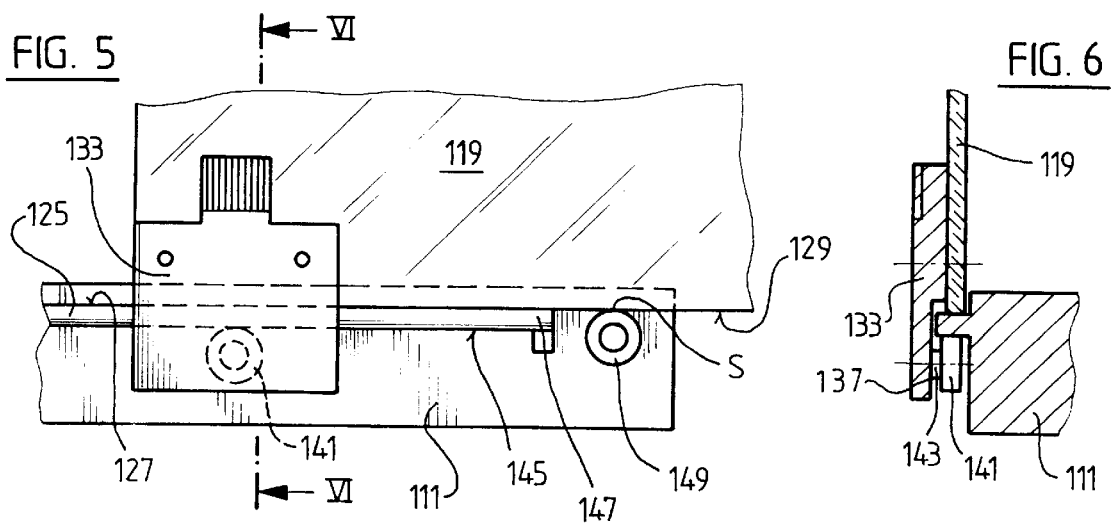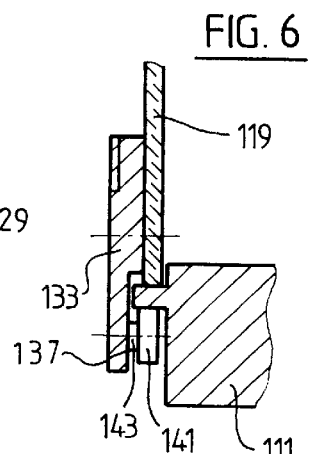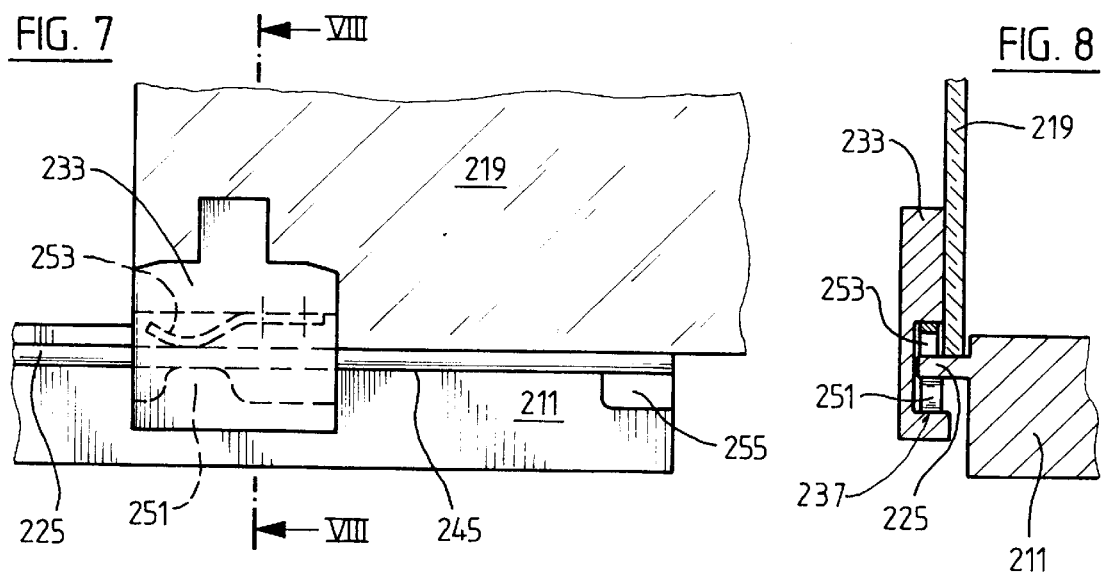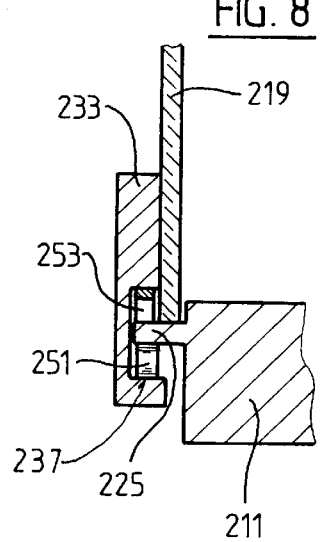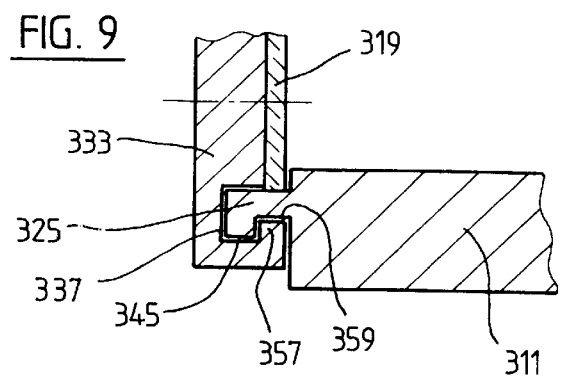

ns of the scale. To

WEIGHING APPARATUS INCLUDING WIND SCREEN MEANS

STATEMENT OF THE INVENTION

The present invention relates to a weighing scale including windscreen means having movable side walls provided with slide members which can be manually grasped to displace the side walls between open and closed positions.

BRIEF DESCRIPTION OF THE PRIOR ART

It is well known in the weighing scale art to provide a windscreen for defining a chamber to protect the weighing scale pan from the adverse effects of ambient wind forces that would otherwise cause errors in the weighing operations. It is also known to equip the windscreen with sliding doors to afford access to the weighing chamber. For example, the U.S. patent to Luechinger et al U.S. Pat. No. 5,298,688 discloses a weighing scale having a housing characterized by a plurality of slidable side walls displaceable between closed and open positions. A top or side wall of the housing includes a plurality of relatively movable segments, at least the longitudinal edge portions of which are in continuous overlapping relation. U.S. Pat. No. 5,264,667, also to Luechinger et al, discloses an improved windscreen in which one side wall is mounted for movement along an arcuate path. In each of the aforementioned patents, however, the side walls are supported by frame members containing vertically facing grooves. Arranged in this manner, the side walls may become wedged or jammed within the grooves. In addition, the grooves are susceptible to accumulation of dirt, thereby making it difficult to slide the door without a major exertion of force.

The Kunz U.S. Pat. No. 5,170,855 discloses a weighing apparatus designed to solve the problem of jamming, use being made of sliding doors that slide on longitudinal guides that are attached laterally with respect to the weighing chamber base and cover. To prevent wedging in the longitudinal guides, toothed racks which engage two toothed wheels are arranged on a common bearing shaft. In this way, one can assure that the sliding door, after it has been pushed all the way to the rear, will lie parallel to the two guides. While this device solves the problem of jamming, its manufacture and assembly are expensive. Moreover, the toothed racks, pinions, and bearings of the shaft carrying the pinions become soiled quickly and are difficult to clean.

The Knothe et al U.S. Pat. No. 4,664,207 discloses a weighing scale having sliding side doors which are guided in a guide rail in the weighing chamber base and, along the top edge, in a second guide rail in the cover of the scale. To prevent the extended sliding doors from tilting backward, there is attached to the lower edge of the sliding doors a rod that slides without play in a correspondingly shaped groove in the longitudinal guide. This guide meets the requirements expected of it as long as the guide groove for the rod is clean. However, because the guide groove extends over the entire opening cleared by the door, the danger of contamination is great and, once contaminated, it becomes difficult to slide the door along the guide groove. Since it is very difficult to clean an undercut guide groove that is open toward the top only through a narrow gap, this device can be used in practice only to a limited degree. Moreover, the manufacture and assembly of a sliding door with a rod fastened along the lower edge by a narrow bar are expensive and laborious.

The present invention was developed to provide a windscreen for a weighing apparatus having sliding side walls which is inexpensive, simple to manufacture and assemble, not susceptible to jamming, and easy to clean. More particularly, the present invention provides a housing having a base, stationary vertical front and rear walls, a top wall, and a pair of opposed side walls defining a chamber containing a weighing scale dish. Slide means including an upper guide member, a lower guide member and a lower slide member mounted to the side walls allow sliding movement of the side walls between closed and open positions relative to the housing.

SUMMARY OF THE INVENTION

Accordingly, a primary object of the present invention is to provide a windscreen for a weighing scale including a housing having a base, stationary vertical front and rear walls, a horizontal top wall, and a pair of opposed slidable side walls adapted to cooperate with the base, top, front, rear and side walls to define a weighing chamber. Slide means are provided including an upper guide member, a lower guide member and a lower slide member connecting at least one of the side walls with the housing for sliding movement between closed and open positions relative to the housing.

According to another object of the invention, the lower slide member is provided with a roller, a cam and spring mechanism or a guide track to reduce friction, prevent jamming and prevent lateral movement of the lower slide member.

According to another object of the invention, the lower slide member is provided with a horizontally facing guide track for receiving the lower guide member, thereby preventing dirt and dust from accumulating in the track.

According to a further object of the invention, the lower guide member includes a laterally spaced longitudinal retaining rib, and the lower slide member includes a retaining projection.

According to another object of the invention, support members are provided to provide additional support for the side walls when they are in the fully open position.

According to another object of the invention, stop members are provided to limit the extent of travel of the side walls in the open direction.

Finally, the top wall may be connected so that it can slide relative to the front and rear walls, thereby affording access to the chamber from above.

BRIEF DESCRIPTION OF THE DRAWINGS

Other objects and advantages of the invention will become apparent from a study of the following specification when viewed in light of the accompanying drawings, in which:

FIG. 5 is a plan view of the second embodiment of the invention;

FIG. 6 is a sectional view taken along line VI—VI of FIG. 5;

FIG. 7 is a third embodiment of the present invention;

FIG. 8 is a sectional view taken along line VIII—VIII of FIG. 7; and

FIG. 9 is a cross sectional view of a fourth embodiment of the invention.

DETAILED DESCRIPTION

Figure 1:
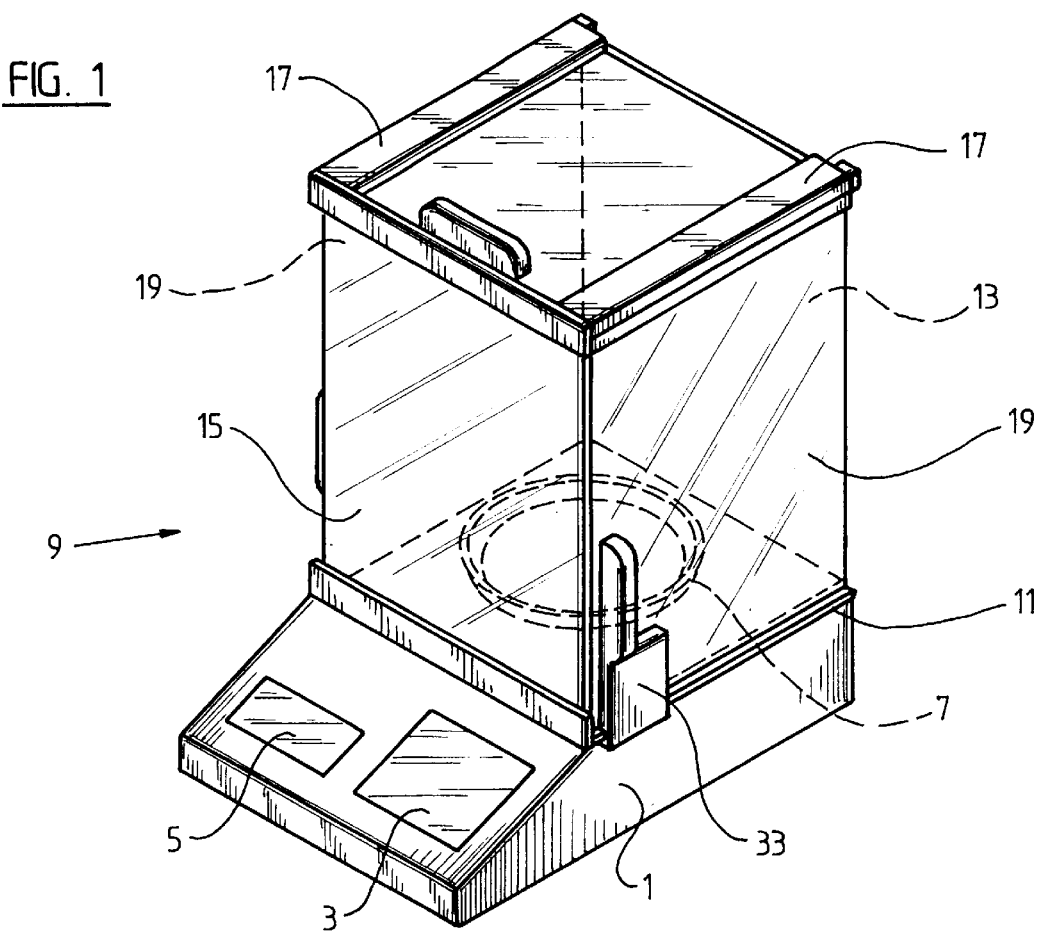
FIG. 1 is a perspective view of the weighing scale apparatus of the present invention.
Figure 2:
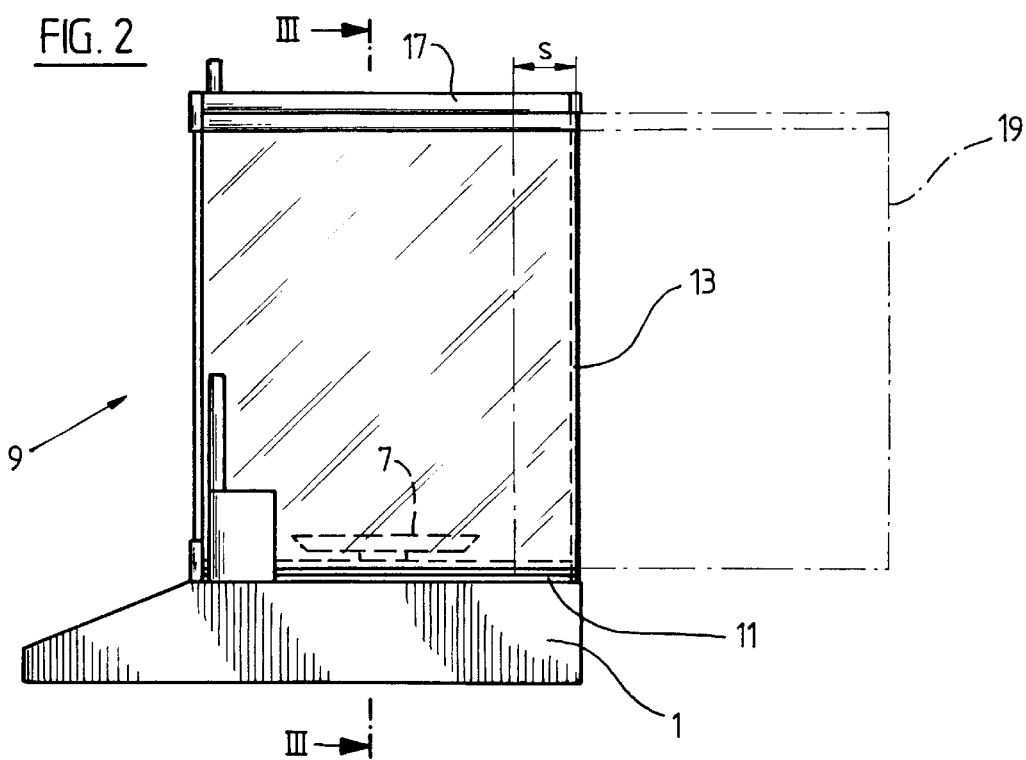
FIG. 2 is a side view of the weighing scale apparatus with a sliding door shown in phantom lines in the fully open position.

Referring first to FIGS. 1 and 2, there is shown a windscreen apparatus 9 mounted on an electronic weighing scale housing 1. The housing is equipped with a display field 3 and a keyboard field 5. The windscreen apparatus includes a base 11, stationary vertical front and rear walls 15 and 13, respectively, which are supported at their lower edges by the base, and a horizontal top wall 16 which is supported by the upper edges of the front and rear walls. The windscreen apparatus 9 also includes a pair of opposed side walls 19 adapted to cooperate with the base, top wall and front and rear walls to define a weighing chamber which encloses a weighing pan 7. The side walls are slidably connected to the housing and may be moved to the position indicated in phantom in FIG. 2 to afford access to the weighing chamber. The side walls are formed of glass or suitable transparent synthetic plastic material and do not include a frame; rather, the lower edge of the side wall slides directly on the lower guide rib portion 25 of the base 11 as described below.

Figure 3:
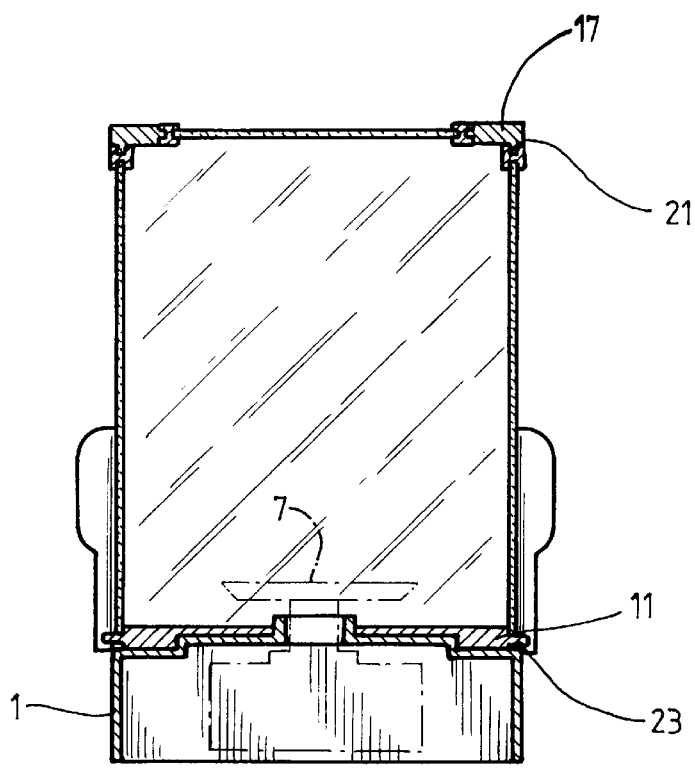
FIG. 3 is a front sectional profile taken along line III—III in FIG. 2.

Struts 17 rigidly mounted on and extending between the front and rear walls include upper guide tracks 21 (FIG. 3) for slidably receiving the upper edges of the side walls 19, respectively. The struts also include second guide tracks which permit the top wall 16 to slide horizontally relative to the front and rear walls.

Figure 4:
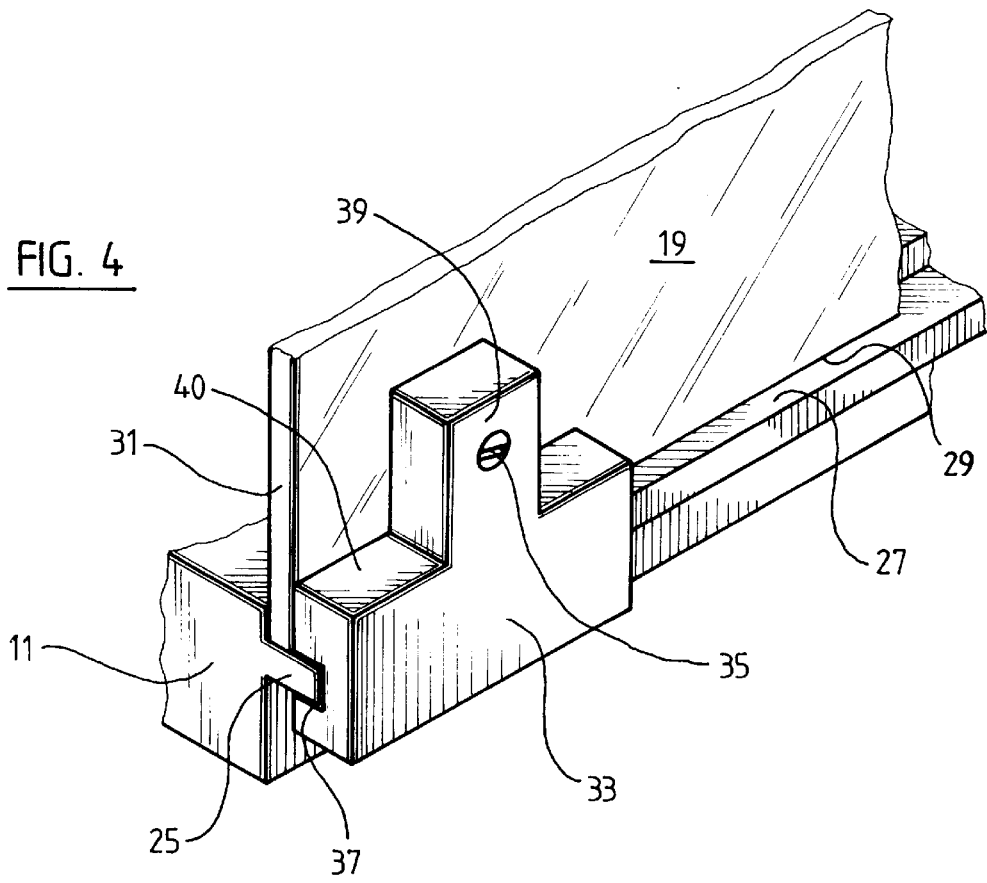
FIG. 4 is a perspective view of the lower slide means, right side sliding wall, and lower guide means.

As shown in FIG. 4, the base 11 includes lower guide ribs 25 which extend outwardly longitudinally and horizontally along each side of the base. While a linear configuration is shown, the lower guide ribs may also be in the form an arcuate path contained in a horizontal plane. The lower guide ribs may be integral with the base or made as separate rails that can be attached to the base.

A lower slide member 33 rigidly mounted on the side wall includes a lower guide track 37 adapted to receive the associated lower guide rib 25 and thereby afford sliding movement between the housing and the side wall. The lower slide member 33 is mounted so that the lower edge 29 of the side wall engages and slides on the upper surface 27 of the lower guide portion 25 of the base. The upper and lower guide tracks 21 and 37, respectively, are formed of a wear resistant material, such as a synthetic plastic material, which provides a smooth gliding surface. As shown, the lower slide member is rigidly connected with the lower portion of side wall 19 by a screw 35. However, the slide member may be fastened by chemical bonding or any other suitable fastening technique. The lower slide member 33 is equipped with a handle portion 39 which allows a user to manually grasp the lower slide member and easily move the side wall between open and closed positions.

FIGS. 5 and 6 show a slide member 133 which includes a roller 141 which is rotationally supported by a horizontal shaft 143. In FIG. 6 it can be seen that side wall 119 slides along the upper surface 127 of the lower guide member 125 and that the roller 141 is in rolling contact with the lower surface 145 of the lower guide member. In addition, the lower edge 129 of the side wall 119 is in rolling contact with and is supported by a support roller 149 which is mounted on the side of the base toward the rear. Because the uppermost extremities of the support roller 149 lies in the plane of the upper surface 127 of the lower guide member 125, if, due to a shift in weight, the side wall tends to rest more heavily upon the rear end 147 of the lower guide member, the increased force is placed on the rollers 141 and 149 rather than the upper surface 127 of the lower guide member. As such, the rollers prevent the side wall from pivoting upward and becoming jammed in the upper 21 and lower 37 guide tracks.

FIGS. 7 and 8 illustrate another embodiment including a lower slide member 233 having a spring 253 which is in sliding contact with the upper surface of the lower guide member 225 and a cam 251 which is in sliding contact with the lower surface 245 of the lower guide member. The spring 253 ensures that lower slide member 233 is always resting against the lower guide member 225 with a pre-stressing force that can be determined by the force of spring 253. A stop member 255 mounted on the side of the base 211 toward the rear and below the lower surface 245 of the lower guide member 225 is provided to prevent the lower slide member and its corresponding wall from traveling beyond the end of the lower guide member 225.

In the embodiment shown in FIG. 9, the lower guide member 325 extends within the corresponding guide track groove 337 and includes a laterally spaced downwardly extending longitudinal rib 345 which extends within a corresponding groove defined by rib 357, thereby to prevent relative lateral movement of the lower slide member 333. As shown in FIG. 9, the lower slide member 333 may be mounted on the side wall so that the lower edge of the side wall contacts the upper surface of the lower guide member and a space 359 is maintained between the lower guide member and the lower slide member.

While in accordance with the provisions of the Patent Statutes, the preferred forms and embodiments have been illustrated and described, it will be apparent to those skilled in the art that various changes may be made without deviating from the inventive concepts set forth above.

What is claimed is:

1. A weighing scale having protective windscreen means, comprising:

(a) a housing including a base, stationary vertical front and rear walls supported by said base, and a horizontal top wall supported by the upper edges of said front and rear walls, said housing also including a pair of opposed side walls adapted to cooperate with said base said top wall and said front, rear and top walls to define an weighing chamber, said side walls having upper and lower edges; and (b) slide means connecting at lease one of said side walls with said housing for sliding movement between closed and open positions relative to said housing, respectively, said slide means including:

(1) horizontal lower guide means (325) connected with said base and extending longitudinally of said side wall;

(2) lower slide means (333) slidably mounted on said lower guide means, said lower slide means containing a first longitudinal guide track (337 into which said lower guide means slidably extends;

(3) means for preventing lateral movement of said lower slide means relative to lower guide means, including a vertically extending retaining rib (345) on said lower guide means that extends vertically within a corresponding vertical groove contained in said guide track; and (4) means rigidly connecting said slide means with the lower edge portion of said one side wall, whereby upon manual grasping of said lower slide means, said one side wall may be displaced between said closed and open positions, respectively.

2. Apparatus as defined in claim 1, said guide means further including upper guide means for receiving said side wall upper edge.

3. Apparatus as defined in claim 2, wherein said upper guide means comprise a horizontal strut rigidly connected between said upper edges of said front and rear walls, said strut containing a second guide track for receiving the upper edge portion of said one side wall.

4. Apparatus as defined in claim 1, wherein said top wall is connected for sliding horizontal movement relative to said front and rear walls.

5. Apparatus as defined in claim 1 wherein said lower slide means includes a handle portion.

6. Apparatus as defined in claim 1, wherein said lower guide means is integral with said base.

7. Apparatus as defined in claim 1 wherein said one side wall is supported in direct sliding engagement with said lower guide means.

8. A weighing scale including protective windscreen means, comprising:
   (a) a housing including a base, stationary vertical front and rear walls supported by said base, and a horizontal top wall supported by said front and rear walls, said housing also including a pair of opposed side walls adapted to cooperate with said base and said front, rear, and top walls to define a weighing chamber, said side walls having upper and lower edges; and
   (b) slide means connecting at least one of said side walls with said housing for sliding movement between closed and open positions relative to said housing, respectively, said slide means including:
      (1) horizontal lower guide means connected with said base and extending longitudinally of said side wall;
      (2) lower slide means slidably mounted on said lower guide means, said lower slide means including spaced cam and spring means in engagement with upper and lower surfaces of said lower guide means, respectively; and
      (3) means rigidly connecting said slide means with the lower edge portion of said one side wall, whereby upon manual grasping of said lower slide means, said one side wall may be displaced between said closed and open positions, respectively.

\* \* \* \* \*